June 4, 1946.　　　A. E. HAMILTON　　　2,401,422
CONTOUR CUTTING APPARATUS
Filed Aug. 25, 1943　　　2 Sheets-Sheet 1

INVENTOR.
ALFRED E. HAMILTON.
BY Archworth Martin
his ATTORNEY.

June 4, 1946.  A. E. HAMILTON  2,401,422
CONTOUR CUTTING APPARATUS
Filed Aug. 25, 1943  2 Sheets-Sheet 2

INVENTOR.
ALFRED E. HAMILTON.
BY Archworth Martin
his ATTORNEY.

Patented June 4, 1946

2,401,422

UNITED STATES PATENT OFFICE 2,401,422

CONTOUR CUTTING APPARATUS

Alfred E. Hamilton, Pittsburgh, Pa.

Application August 25, 1943, Serial No. 499,948

2 Claims. (Cl. 82—14)

My invention relates to the cutting of contours on metal or other materials, and more particularly to shaping operations wherein the work piece and the cutting tool are rotated relative to one another, about the axis of the work piece, while the tool is being caused to travel longitudinally of the work piece.

Where it is desired, in machines of this type, to so shape an article or work piece that it will be given a contour which varies in distance from the axis of the article and the axis of rotation, pattern plates or templets are provided for automatically shifting the cutting tool radially of the work during its longitudinal travel. One of the simpler operations of this type is the cutting of tapered pins or hollow articles on a lathe, in which case the guide needs to be simply tapered or sloped relative to the axis of the article, the gradual reduction in diameter being consequently uniform from end-to-end of the article.

In cutting contours which give a non-uniformly varying diameter or wall thickness to an article, templets or guides are provided which will shift the cutting tool radially in both directions, in accordance with the required contour. Difficulty has been experienced in this respect, both where the tool has to at times be shifted sharply radially of the work and where accurately converging angular surfaces must be cut on the work piece. In the first-named instance, the guide surface of the templet has a sharp deflection toward the center or axis of the work, with consequent friction that may be so great as to bind or strain the tool-guiding elements, to the detriment of accurate cutting. While antifriction rollers have been placed on the cutting tool guide, to reduce this frictional resistance, such expedient has not been entirely satisfactory, for various reasons, principally because no roller will accurately follow sharp deflections on the templet—particularly at the apex of an angle formed by two straight-line surfaces on the templet, because no roller can properly and snugly enter such angle.

One object of my invention is to provide a method and apparatus whereby contours may be more accurately and conveniently formed than has heretofore been possible with machines of this type.

Another object of my invention is to provide a method of cutting irregular contours in such manner that there is a minimum of frictional resistance to the radial shifting of a cutting tool.

Figure 1:
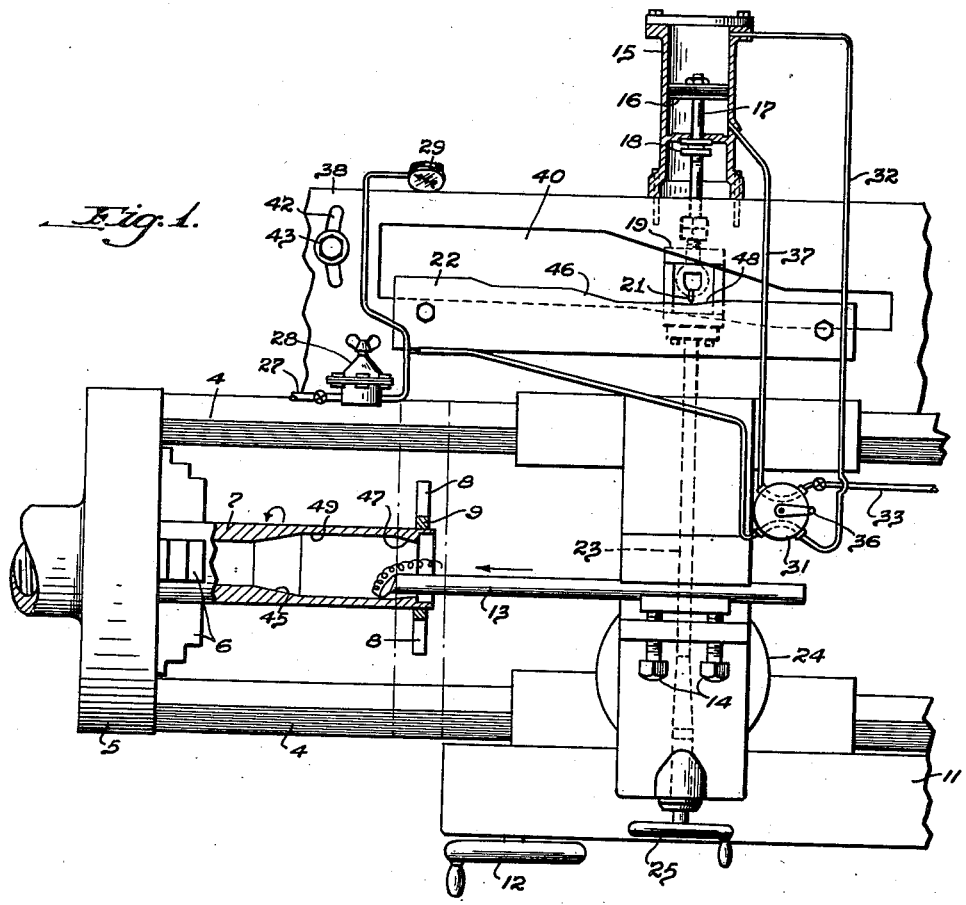
Figure 2:
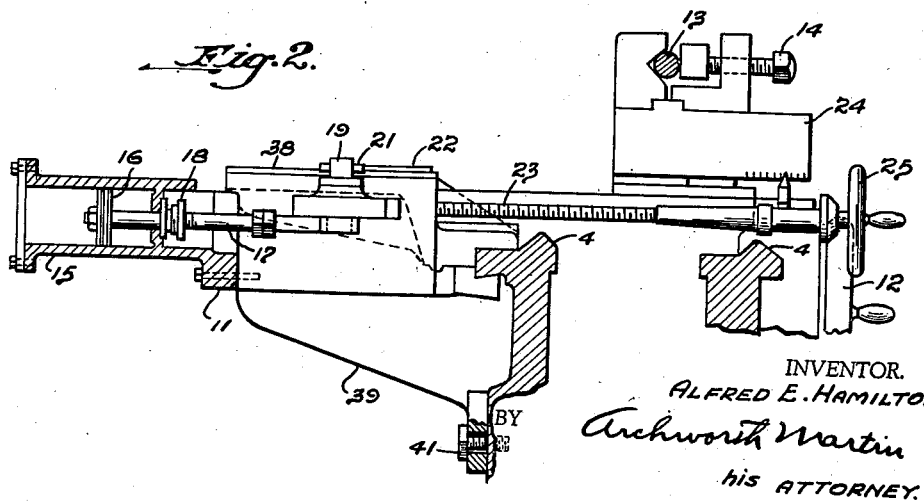
Figure 3:
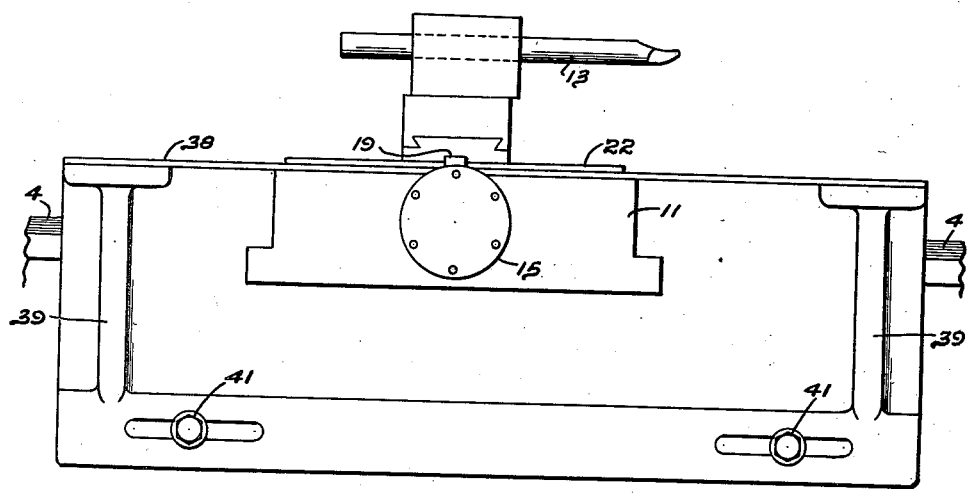
Figure 4:
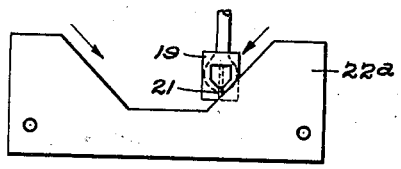
Figures 5, 6:
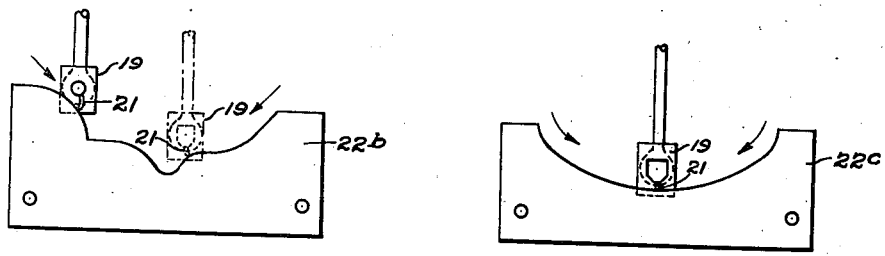

As shown in the accompanying drawings, Figure 1 is a plan view of the apparatus, partly in section; Fig. 2 is a cross sectional view thereof; Fig. 3 is a side view of a portion of the machine, and Figs. 4, 5 and 6, are illustrative of other forms of templets and the directional travel of the follower with respect thereto.

While the invention is here shown as employed in the cutting of tubular blanks on their interior walls, for the purpose of forming shell inserts, bomb die inserts and the like, it will be understood that the apparatus can be used also in shaping the exterior surfaces of work pieces such as turbine shafts, etc.

The apparatus is shown as applied to a lathe or the like of conventional form that comprises the usual lathe bed and ways 4, with a rotatable chuck 5 that is driven in any suitable manner and is provided with the usual jaws 6 for gripping a work piece 7 at its inner end. A steady rest 8 is carried by the lathe bed and supports a bearing collar 9 for supporting the outer end of the work piece.

A tool carriage 11 is slidably supported on the ways 4 and is shifted longitudinally of such ways by a reversible feed screw (not shown) or by a hand wheel 12, in a manner common in the art, to shift the cutting tool back and forth longitudinally of the work piece. The cutting tool 13 is held on the carriage by clamping screws 14. A cylinder 15 is mounted on the tool carriage and contains a piston 16 and piston rod 17 with which an adjusting nut 18 has threaded connection and adjustably limits the stroke of the piston. The piston rod has connection with a head 19 that carries the pointer or guide finger 21 which has cooperative engagement with a pattern plate or templet 22, that is fixedly mounted relative to the tool carriage, as will be hereinafter explained.

An adjusting screw 23 has one end rotatably connected with the head 19 and has threaded connection with a support 24 which carries the clamps for the cutting tool 13. A hand wheel 25 is rigidly secured to the adjusting screw 23, so that when such wheel is turned the support 24 and the cutting tool will be shifted relative to the guide finger 21, in order to produce the desired depth of cut in the work piece 7.

In order to move the cutting tool against the work piece, to the extent permitted by the guide finger and the templet, fluid pressure is maintained against the outer side of the piston 16, the tool carriage 11 being meanwhile shifted along the ways 4. When fluid pressure is admitted to the inner side of the piston, the tool will be moved out of cutting engagement with the work piece. Fluid pressure for operating the piston is supplied from a pressure line 27 past a pressure reducing valve 28 that may be adjusted to secure the desired degree of pressure in the outer end of the cylinder 15 and thus vary the cutting pressure of the tool on the work. A pressure indicator 29 is provided for indicating the degree of cutting pressure. As shown in Fig. 1, pressure is being supplied through a valve 31 and a pipe 32 to the outer side of the piston 26, to hold the cutting tool in operative position, the piston at its inner side being open to exhaust at 33. When the valve handle 36 is turned 90 degrees from the position shown, pressure will be admitted through a pipe 37 to the inner side of the piston, to retract the cutting tool and the pointer, exhaust from the outer side of the piston then taking place through pipe 32.

The finger-contacting edge of the templet 22 will of course have the contour desired for the finished work piece. The templet is secured by suitable screws to a plate 38 that is supported independently of the tool carriage, so that it will remain stationary during shifting movements of the carriage. The plate 38 is supported from the lathe bed by a pair of brackets 39 that are connected to the lathe bed by screws 41, the screws 41 extending through horizontally-extending slots in the brackets, so as to permit adjustment of the plate 38 and the templet 22 longitudinally of the ways 4. Near each of its ends, the plate 38 is provided with arcuate slots 42 through which screws 43 extend into the brackets 39, so that the plate and the templet may be angularly adjusted relative to the axis of the work piece. The plate 38 has a cut-out or slot at 40, through which the finger-carrying head extends and in which it moves.

The guide finger 21 has its templet-engaging end approximately of the contour of the cutting tool so that it will follow accurately the contour of the templet, with consequent accurate control of the cutting tool. This is particularly desirable where there are sharp changes of contour or angular surfaces are to be cut, as for example, in the case of the templets shown in Figs. 4 and 5. It will be obvious that if an anti-friction roller were provided on the pointer, to reduce the drag or friction thereof on the templet, such roller could not in many cases follow the templet edge with sufficient accuracy, where the angular surfaces meet.

In order to avoid excessive friction between the pointer and templet when cutting surfaces at various angles with respect to the axis of the work piece, I so manipulate or shift the carriage 11 on the ways 4 that there will be a minimum of frictional resistance or drag, as between the pointer and the camming edge of the templet. To this end, when cutting the surface 45 in the work piece, the carriage is shifted away from the chuck 5, the pointer 21 at this time moving along the surface 46 on the templet. It will be seen that by such a procedure there is much less friction than if the carriage were being moved toward the chuck at that zone and thus causing the pointer in effect to ride "up" the surface 46, against the constant pressure at the rear side of the piston 16. Similarly, in order to cut the oppositely-sloping surface 47 in the work piece, the cutting tool carriage is shifted toward the outer end of the work piece while the tool is held out of engagement with the work and the pointer out of engagement with the templet and when the parts are restored to cutting position the carriage is moved toward the chuck, the pointer at this time being moved "down" the surface 48 on the templet to effect cutting of the surface 47. It will be understood that the intermediate surfaces 49 on the work piece can be cut with the tool carriage moving in either direction.

Likewise, when cutting contours by the use of templets 22a, 22b and 22c, such as shown in Figs. 4, 5 and 6, the directions of the tool carriage movement, during a cutting operation will be so changed that the pointer will be caused to travel along the templet in the directions indicated by the arrows in these figures. In other words when deepening the cuts in a work piece the carriage will be shifted in such a direction that the pointer will be moved inwardly along a surface which inclines toward the axis of the work piece.

It will be understood that several cuts may be required in order to reduce a work piece to a desired dimension or diameter, including the usual roughing and finishing cuts. The final adjustment of the screw 23 by the hand wheel 25 determines the thickness given to the finished work piece. Also, the apparatus can be employed in cutting ordinary uniformly tapered contours, by the use of a templet or pattern plate of suitable slope or set at a desired angle through adjustment of the plate 38 at 42—43.

Cutting of accurate contours interiorly of tubular work pieces, which is so-called "blind" operation, is facilitated by my apparatus, since when making the finish cut, the hand wheel may be adjusted to such position that gage marks associated with the tool slide will indicate when adjustment of the tool 13 has been made to the desired wall thicknesses, and the cutting operation completed with accuracy, and without the necessity of repeatedly taking measurements of the work piece.

As above stated, the guide finger or follower 21 guides the cutter with greater accuracy than a roller would. Furthermore it will have the same contour at its tip as the cutting tool point and there is no play such as would be the case with a guide roller. To avoid wear or abrasion, the templet 22 will be of hard material such as nickel-chrome cast iron, or cast iron, flame-hardened along its guiding edge, and the guide finger be made of tool steel or other hard material, whereby they will withstand the pressure in the cylinder.

I claim as my invention:

1. The combination with a lathe machine having horizontally-extending ways and a tool carriage movable longitudinally thereof with respect to a work-holding chuck or the like, of a tool-carrying cross slide on the carriage, a cutting tool on the slide in position to engage a work piece in the chuck, during movement of the carriage, a templet follower on one end of the cross slide, a horizontally-disposed plate normally rigidly positioned beneath the said end of the slide and having a longitudinal slot, a templet mounted on the upper face of the plate, adjacent to one edge of the slot, a fluid-operated piston disposed beneath said plate and having a piston rod extending transversely thereof, a head on the rod and extending upwardly through the slot and carrying the templet follower on its upper end, and an adjusting screw extending longitudinally of the cross slide and rotatably connected with said head and having screw-threaded connection with the cross slide, whereby the tool can be adjusted relative to the piston and the follower.

2. The combination with a lathe machine having horizontally-extending ways and a tool carriage movable longitudinally thereof with respect to a work-holding chuck or the like, of a tool-carrying cross slide on the carriage, a cutting tool on the slide in position to engage a work piece in the chuck, during movement of the carriage, a templet follower on one end of the cross slide, a horizontally-disposed plate normally rigidly positioned beneath the said end of the slide and having a longitudinal slot, a templet mounted on the upper face of the plate, adjacent to one edge of the slot, a fluid-operated piston disposed beneath said plate and having a piston rod extending transversely thereof, a head on the rod and extending upwardly through the slot and carrying the templet follower on its upper end, and an adjusting screw extending longitudinally of the cross slide and rotatably connected with said head and having screw-threaded connection with the cross slide, whereby the tool can be adjusted relative to the piston and the follower, the plate and the templet being adjustable as a unit, about a vertical axis, relative to the tool-carrying cross slide.

ALFRED E. HAMILTON.